United States Patent
Katou et al.

(10) Patent No.: US 8,218,342 B2
(45) Date of Patent: Jul. 10, 2012

(54) POWER SUPPLY DEVICE

(75) Inventors: Masakazu Katou, Sakai (JP); Ryou Nakamoto, Sakai (JP); Keisuke Shimatani, Sakai (JP); Keiichi Yoshisaka, Sakai (JP); Masafumi Hashimoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 415 days.

(21) Appl. No.: 12/528,406

(22) PCT Filed: Mar. 17, 2008

(86) PCT No.: PCT/JP2008/054912
§ 371 (c)(1),
(2), (4) Date: Aug. 24, 2009

(87) PCT Pub. No.: WO2008/123048
PCT Pub. Date: Oct. 16, 2008

(65) Prior Publication Data
US 2010/0061127 A1    Mar. 11, 2010

(30) Foreign Application Priority Data
Mar. 30, 2007  (JP) ................................. 2007-092388

(51) Int. Cl.
*H02M 7/19*  (2006.01)

(52) U.S. Cl. ............................. 363/61; 307/110; 363/44

(58) Field of Classification Search .................... 363/61, 363/44–48, 84, 89–90, 125–127, 142–143, 363/34, 37; 307/110; 323/300
See application file for complete search history.

(56) References Cited

U.S. PATENT DOCUMENTS

| 5,607,604 | A | * | 3/1997 | Ishikawa ....................... 219/110 |
| 6,687,142 | B2 | | 2/2004 | Scott |
| 7,911,173 | B2 | * | 3/2011 | Boyadjieff .................... 318/621 |
| 2007/0035280 | A1 | | 2/2007 | Fujiyama et al. |

FOREIGN PATENT DOCUMENTS

| JP | 2-262868 A | 10/1990 |
| JP | 10-337031 A | 12/1998 |
| JP | 2000-166241 A | 6/2000 |
| JP | 2003-174779 A | 6/2003 |
| JP | 2007-49854 A | 2/2007 |

* cited by examiner

*Primary Examiner* — Harry Behm
(74) *Attorney, Agent, or Firm* — Birch, Stewart, Kolasch & Birch, LLP.

(57) ABSTRACT

The power supply device according to the present invention converts alternating-current power into direct-current power, and supplies the direct-current power to a load. Further, the power supply device includes a buffer, a control section, a rectifier circuit, a smoothing circuit, and a switch. After a predetermined zero cross point is detected, the control section uses in common, over a predetermined period of the alternating-current power, predetermined parameters retained in the buffer in calculating a timing at which a PAM interrupt pulse is generated.

6 Claims, 3 Drawing Sheets

POWER SUPPLY DEVICE

TECHNICAL FIELD

The present invention relates to a power supply device, and more particularly, to a power supply device which performs PAM control.

BACKGROUND ART

As air conditioners which perform heating and cooling, there are known air conditioners which change an operation frequency of a compressor when adjusting heating and cooling performance. Such air conditioners control an rpm of a motor which drives the compressor through inverter control.

As power supply devices which perform inverter control, there are known power supply devices which perform pulse amplitude modulation (PAM). In PAM control, alternating voltage is converted into direct voltage by a rectifier circuit, and thereafter, is converted into desired voltage by a booster circuit. The booster circuit is composed of a reactor element, a switching element, a diode, a capacitor, and the like.

The booster circuit controls a ratio (duty ratio) of ON time of the switching element. Accordingly, it is possible to control a waveform and a current value of an alternating current input to the rectifier circuit provided at a preceding stage, which enables an improvement in power factor and a reduction in high frequency current, as well as control of direct voltage.

Note that the generation of at least two or more PAM pulses in a half period of a power supply frequency (increase in the number of pulses) enables a further improvement in power factor and a further reduction in high frequency current. The PAM control is referred to as multi-pulse PAM control.

As a power supply device which performs PAM control, there is, for example, one described in Patent Document 1.

Patent Document 1: Japanese Patent Application Laid-Open No. 10-330731

DISCLOSURE OF INVENTION

Problems to be Solved by the Invention

In the power supply device which performs the multi-pulse PAM control, a PAM interrupt pulse is generated when a PAM waveform is output. The output of the PAM waveform is inverted from ON to OFF, or from OFF to ON every time the PAM interrupt pulse is input. That is, ON/OFF of the switching element forming the booster circuit is controlled every time the PAM interrupt pulse is input. In the power supply device, a predetermined parameter, which is used in calculating an output timing of the PAM interrupt pulse, is updated in an asynchronous manner.

Accordingly, the parameter is inadvertently updated during the generation of a plurality of continuous PAM interrupt pulses. In such a case, for example, an OFF period of the PAM waveform is partially lost, and accordingly in some cases, an ON period of the PAM waveform is increased considerably. As a result of the partial loss of the PAM waveform as described above, abnormal current flows through a circuit in some cases.

It is therefore an object of the present invention to provide a power supply device which performs PAM control, capable of preventing a partial loss or the like of a PAM output waveform.

Means to Solve the Problems

In order to solve the above-mentioned problems, a power supply device according to Claim 1 of the present invention, which converts alternating-current power into direct-current power and supplies the direct-current power to a load (40), includes: a buffer; a control section; a rectifier circuit (10) which rectifies the alternating-current power; a smoothing circuit (20) which includes a first capacitor (2) and a second capacitor (3) connected in series, smoothes an output of the rectifier circuit, and outputs the direct-current power; and a switch (SW) provided between the rectifier circuit and a connection point (N1) between the first capacitor and the second capacitor, wherein the control section is configured to: detect a zero cross point of the alternating-current power input to the rectifier circuit; calculate in advance, at any stage prior to the detection of the predetermined zero cross point, a predetermined parameter (ph1, ph2, tzwav) which is used when a generation timing of a PAM interrupt pulse is calculated, the PAM interrupt pulse being used when a PAM waveform having at least two or more pulses in a half period of the alternating-current power is generated and being input to the switch; retain the calculated predetermined parameter in the buffer; and use in common, after the detection of predetermined zero cross point, the predetermined parameter retained in the buffer in calculating the generation timing of the PAM interrupt pulse over a predetermined period of the alternating-current power.

Further, in the power supply device according to Claim 2 of the present invention, in the power supply device according to Claim 1, the control section is configured to: calculate in advance the predetermined parameter again at any stage prior to a lapse of the predetermined period; retain, in the buffer, the predetermined parameter after being calculated again; and use in common, after the lapse of the predetermined period, the predetermined parameter after being calculated again in calculating the generation timing of the PAM interrupt pulse.

Further, in the power supply device according to Claim 3 of the present invention, in the power supply device according to Claim 2, the predetermined period is one period of the alternating-current power.

Further, in the power supply device according to Claim 4 of the present invention, in the power supply device according to Claim 2, the predetermined parameter is a PAM interrupt pulse phase control value (ph1, ph2) which is a gap amount from the zero cross point of the alternating-current power and serves as a reference of the generation timing of the PAM interrupt pulse.

Further, in the power supply device according to Claim 5 of the present invention, in the power supply device according to Claim 2, the predetermined parameter is a gap value (tzwav) between the predetermined zero cross point of the alternating-current power and a generation timing of a predetermined zero cross interrupt pulse which indicates that the predetermined zero cross point is detected.

Further, in the power supply device according to Claim 6 of the present invention, in the power supply device according to Claim 2, the predetermined parameter is a variable (tdss) for defining soft start of the PAM waveform.

In the power supply device according to Claim 7 of the present invention, in the power supply device according to Claim 6, under a condition when generation of a pulse waveform or after detection of a PAM overcurrent by the control section, the control section is further configured to: calculate the variable for defining the soft start of the PAM waveform from a start to an end of the soft start; and calculate the generation timing of the PAM interrupt pulse using a PAM interrupt pulse phase control value (ph1, ph2) which is a gap amount from the zero cross point of the alternating-current power and serves as a reference of the generation timing of the PAM interrupt pulse, a gap value (tzwav) between the predetermined zero cross point of the alternating-current power and the generation timing of a predetermined zero cross interrupt pulse which indicates that the predetermined zero cross point is detected, and the variable for defining the soft start of the PAM waveform.

The power supply device according to Claim 1 of the present invention uses in common, after the predetermined zero cross point is detected, the predetermined parameter retained in the buffer in calculating the generation timing of the PAM interrupt pulse over the predetermined period of the alternating-current power.

Accordingly, the generation of the partial loss or the like of the PAM waveform can be prevented. Therefore, it is possible to prevent an abnormal current from flowing through the power supply device, which results from the partial loss or the like of the PAM waveform.

Further, in the power supply device according to Claim 2 of the present invention, after the lapse of the predetermined period, the predetermined parameter after being calculated again is used in common in calculating the generation timing of the PAM interrupt pulse.

Accordingly, compared with a case where the predetermined parameter is not calculated again and updated at all, it is possible to prevent deterioration of a balance between a voltage of the first capacitor and a voltage of the second capacitor. Consequently, it is possible to suppress malfunction occurring in control of the load.

Further, in the power supply device according to Claim 3 of the present invention, the predetermined period is one period of the alternating-current power. Accordingly, it is possible to completely prevent malfunction from occurring in control of the load.

Further, in the power supply device according to Claims 4 through 7, the predetermined parameter is the PAM interrupt pulse phase control value, the gap value between the predetermined zero cross point and the generation timing of the predetermined zero cross interrupt pulse, or the variable for defining the soft start of the PAM waveform.

Accordingly, it is possible to always maintain a suppression effect of a high frequency current because the control section updates and calculates again the predetermined parameter for every predetermined period of the alternating-current power.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, the present invention is specifically described with reference to the attached drawings showing an embodiment thereof.

Embodiment

An air conditioner is composed of an indoor unit and an outdoor unit. The indoor unit and the outdoor unit are connected to each other through a refrigerant pipe through which a refrigerant is circulated.

In the air conditioner, a compressor is operated by rotary driving of a compressor motor, whereby the refrigerant is circulated through the refrigerant pipe. In a cooling mode, the refrigerant compressed by the compressor is supplied to a heat exchanger to be liquefied. Then, the liquefied refrigerant is vaporized by the heat exchanger of the indoor unit, to thereby cool air passing through the heat exchanger. In contrast, in a heating mode, the refrigerant compressed by the compressor is condensed by the heat exchanger of the indoor unit, whereby heat thereof is dissipated. Then, the air passing through the heat exchanger is heated by the heat dissipated from the refrigerant.

Figure 1:
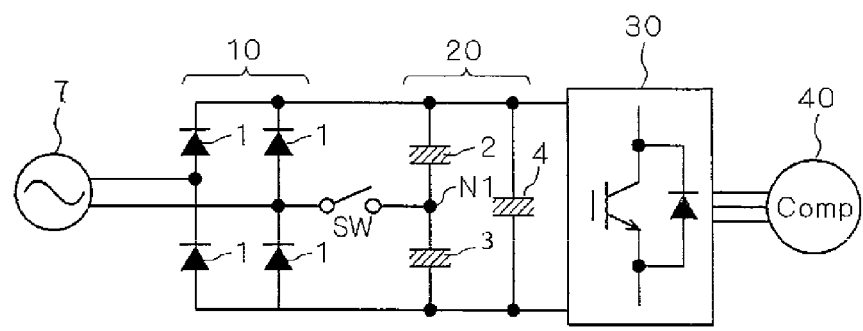
FIG. 1 is a circuit diagram showing a structure of a power supply device.

The outdoor unit includes a power supply device shown in FIG. 1 and a control section (not shown) provided in the power supply device. The power supply device converts alternating-current power supply 7 to direct-current power for driving a compressor motor 40. The control section controls an operation of the outdoor unit and an operation of the power supply device as well.

As shown in FIG. 1, the power supply device is composed of a rectifier circuit 10, a smoothing circuit 20, an inverter circuit 30, and a switch SW. In addition, the power supply device includes a buffer and the control section which are not shown in FIG. 1. The power supply device converts alternating-current power supplied from the alternating-current power supply 7 to direct-current power having a predetermined voltage. Then, the power supply device outputs (supplies) the direct-current power to the compressor motor (regarded as a load) 40 through the inverter circuit 30.

The inverter circuit 30 has a general structure in which a switching element is provided. The switching element is on/off controlled, with the result that the inverter circuit 30 outputs direct-current power corresponding to a switching operation to the compressor motor 40. Note that the compressor motor 40 is driven to rotate by an rpm corresponding to the output power (voltage).

Figure 2:
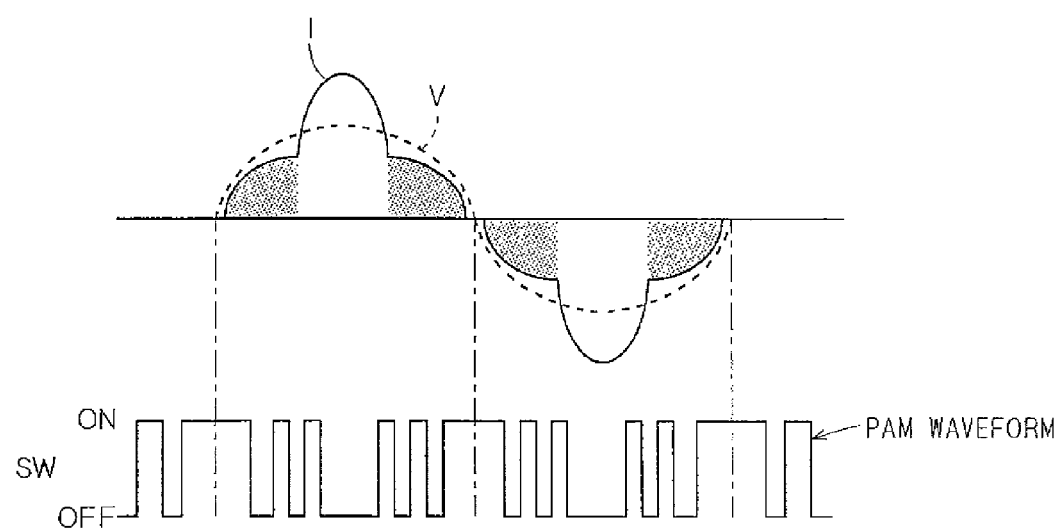
FIG. 2 is a diagram showing a state of PAM control.

In FIG. 2, the switch SW repeats the switching operation a plurality of times. Accordingly, a PAM waveform (referred to as multi-pulse PAM) is generated. The multi-pulse PAM includes at least two or more PAM pulses during a half period of an alternating-current voltage V. Through the generation of the multi-pulse PAM, a high frequency of a current I flowing through the rectifier circuit 10 can be suppressed further.

Meanwhile, the rectifier circuit 10 is formed by connecting a plurality of diodes 1 in a bridge-like shape. The alternating-current power supply 7 is connected to an input section of the rectifier circuit 10. The rectifier circuit 10 is a circuit for rectifying the alternating-current power supply 7. Further, the smoothing circuit 20 is connected to an output section of the rectifier circuit 10.

The smoothing circuit 20 is composed of capacitors (regarded as a first capacitor and a second capacitor) 2 and 3 which are connected in series, and a capacitor 4 (regarded as a third capacitor) connected in parallel with the capacitors 2 and 3. The smoothing circuit 20 smoothes a pulsating current output from the rectifier circuit 10 and outputs direct-current power. Accordingly, the rectifier circuit 10 and the smoothing circuit 20 form a voltage multiplying full-wave rectifier circuit.

The switch SW is provided between the rectifier circuit 10 and the smoothing circuit 20. More specifically, the switch SW is provided between the rectifier circuit 10 and a connection point N1. The connection point N1 is positioned between the first capacitor 2 and the second capacitor 3. The switch SW is on/off controlled by respective interrupt pulses of high-frequency waves output from the control section.

Meanwhile, the control section is connected with input power detecting means. The control section reads, by the input power detecting means, a phase signal of a waveform of an input voltage together with an alternating-current voltage (input voltage) from the alternating-current power supply 7. Then, the control section detects, from the read phase signal, a zero cross point at which a waveform of an alternating-current power supply voltage is switched from plus to minus (minus to plus). The control section calculates a timing at which a PAM interrupt pulse is output based on the zero cross point.

Note that, though not shown in FIG. 1, the power supply device includes a buffer. The buffer retains parameters which are used when a PAM interrupt pulse generation timing is calculated.

Hereinafter, referring to a timing chart shown in FIG. 3, the operation (more specifically, operation of generating a PAM interrupt pulse) of the power supply device according to this embodiment is described.

Figure 3:
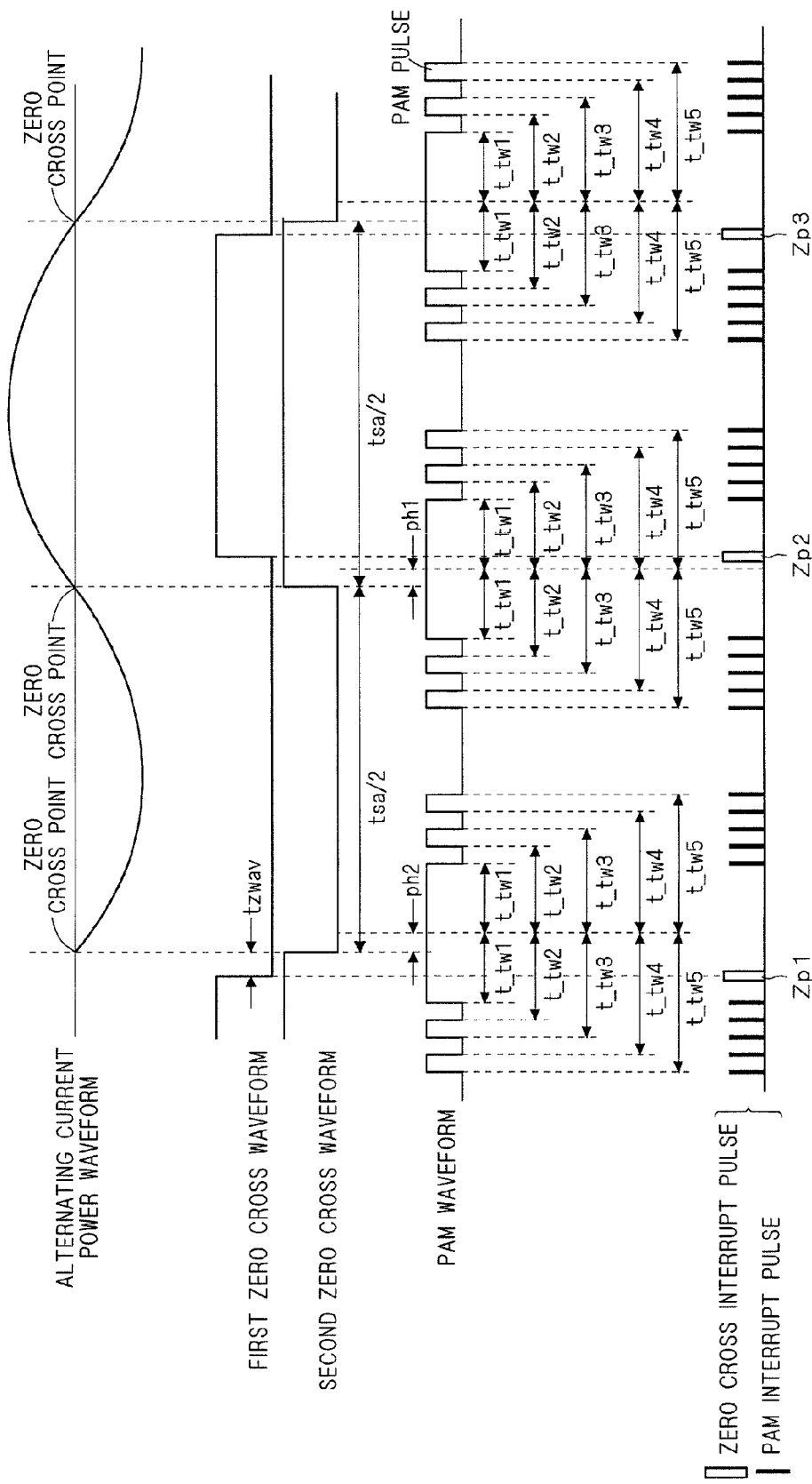
FIG. 3 is a diagram for describing an operation of the power supply device according to the present invention.

Here, there are shown, from an upper stage to a lower stage of FIG. 3, an alternating-current power waveform, a first zero cross waveform, a second zero cross waveform, a PAM waveform (also regarded as an ON/OFF waveform of the switch SW), and the PAM interrupt pulse and a zero cross interrupt pulse. The alternating-current power waveform is a waveform input to the power supply device from the alternating-current power supply 7. The first zero cross waveform is a waveform in which ON/OFF is changed correspondingly to the zero cross interrupt pulse. The second zero cross waveform is a waveform in which ON/OFF is changed correspondingly to the zero cross point.

First, the control section detects a zero cross point of alternating-current power input to the rectifier circuit 10. Next, the control section generates a zero cross interrupt pulse in synchronization with the detection of the zero cross point.

It is assumed here that, in the actual circuit configuration, the zero cross interrupt pulse is generated in synchronization with the detection of the zero cross point of the alternating-current power. However, there occurs a gap between an output of an actual zero cross point and an output of the zero cross interrupt pulse. For this reason, as shown in FIG. 3, there is provided a gap between a predetermined zero cross point of the alternating-current power and a generation timing of a predetermined zero cross interrupt pulse which indicates the detection of the predetermined zero cross point.

Specifically, when the alternating-current power is shifted from plus to minus, the zero cross interrupt pulse is generated earlier than the actual zero cross point by a time tzwav. On the other hand, when the alternating-current power is shifted from minus to plus, the zero cross interrupt pulse is generated later than the actual zero cross point by the time tzwav. As a result, the actual zero cross point and the output of the zero cross interrupt pulse can be caused to approximately coincide with each other. Here, the time tzwav can be regarded as a gap value between the zero cross point of the alternating-current power and the generation timing of the predetermined zero cross interrupt pulse which indicates the detection of the zero cross point.

The timing at which the zero cross interrupt pulse is generated is provided in response to a zero cross signal (ON/OFF signal) corresponding to an input voltage Vi of the rectifier circuit 10. Specifically, the zero cross interrupt pulse outputs an ON signal when the input voltage Vi is higher than a predetermined value, which turns into an OFF signal when the input voltage Vi is equal to or lower than the predetermined value. That is, it is detected at a rising position of the ON signal that the input voltage Vi is decreased to be equal to or smaller than the predetermined value toward the zero cross point. The time tzwav indicates the gap value between the falling position and the zero cross point.

Then, the control section obtains in advance predetermined parameters at any stage prior to the detection of the predetermined zero cross point (in other words, prior to the generation of a predetermined zero cross interrupt pulse Zp1 indicating the detection of the predetermined zero cross point).

Here, as the predetermined parameters, there are the time tzwav, PAM pulse phase control values ph1 and ph2 described below, and a variable tdss described below. The predetermined parameters are used in calculating the generation timing of the PAM interrupt pulse. Here, the PAM interrupt pulse is input to the switch SW, thereby controlling a switching operation of the switch. That is, the PAM interrupt pulse is used for a plurality of times of switching operations of the switch SW (in other words, the PAM interrupt pulse is used when the multi-pulse PAM waveform is generated (referred to as multi-pulse PAM control)).

Note that as parameters which are used when the generation timing of the PAM interrupt pulse is calculated, there are other parameters in addition to the predetermined parameters. The predetermined parameters are calculated again in advance by the control section at any stage. Meanwhile, the other parameters are not, for example, updated during the PAM control and always has a constant value.

The control section retains, in the buffer, the predetermined parameters obtained prior to the generation of the predetermined zero cross interrupt pulse Zp1. Here, there are retained, in the buffer, the predetermined parameters which are calculated again during the PAM control and the other parameters which are not, for example, updated during the PAM control.

Next, after the detection of the predetermined zero cross point (in other words, after the predetermined zero cross interrupt pulse Zp1 is input), the control section successively calculates generation timings of a plurality of PAM interrupt pulses with the use of the predetermined parameters retained in the buffer. Here, the calculation is performed over the predetermined period (=period of alternating-current power× positive number). In addition, the same predetermined parameters are used in the calculation.

Here, if the predetermined period is excessively long, a voltage balance between the capacitors 2 and 3 is deteriorated, resulting in malfunction occurring in control of the compressor motor 40. For this reason, the shorter the predetermined period is, the better. Therefore, the most preferred predetermined period is one period of the alternating-current power.

Next, the control section generates the respective PAM interrupt pulses at the timings calculated as described above (see FIG. 3). Here, parameters t_tw1 to t_tw5 shown in FIG. 3 are the other parameters. The PAM interrupt pulses generated prior to the predetermined zero cross interrupt pulse Zp1 of FIG. 3 are generated at timings which are calculated using the predetermined parameters which have been calculated earlier.

The description is further given with the predetermined period being as one period tsa of the alternating-current power.

In this case, the control section calculates the generation timings of the PAM interrupt pulses during a period of time from the predetermined zero cross interrupt pulse Zp1 to the zero cross interrupt pulse Zp3 which is generated after one cycle of the alternating-current power. Here, the calculation is performed using the predetermined parameters tzwav, ph1, ph2, and tdss stored in the buffer and the other parameters t_tw1 to t_tw5. Then, the PAM interrupt pulses are generated at the calculated generation timings of the PAM interrupt pulses.

Note that a soft start function is required under a condition during the generation of the pulse waveform or after the detection of a PAM overcurrent by the control section. Therefore, in order to perform the soft start process, the control section calculates the variable tdss from the start to the end of the soft start. Here, the variable tdss is a variable for defining the soft start of the PAM waveform. Then, the control section calculates the timing at which the PAM interrupt pulse is generated using the phase control values ph1 and ph2, the gap value tzwav, and the calculated variable tdss. Note that the variable tdss becomes zero after the end of the soft start.

Here, a zero cross interrupt pulse Zp2 is also generated between the predetermined zero cross interrupt pulse Zp1 and zero cross interrupt pulse Zp3. However, the zero cross interrupt pulse Zp2 is not conducive to the calculation of the generation timing of the PAM interrupt pulse.

When the PAM interrupt pulse is generated, the switching operation of the switch SW is controlled in synchronization with this (the PAM waveform of FIG. 3 shows the switching operation in the form of a waveform).

Here, the PAM pulse phase control values ph1 and ph2 which are predetermined parameters are used for defining a period serving as the reference of the generation timing of the PAM waveform. As shown in FIG. 3, the respective PAM pulses are generated at symmetric periods with a period deviated from the zero cross point by the PAM pulse phase control value ph1 or ph2 being set as the reference (in other words, the PAM interrupt pulses are generated at symmetric periods with a period of the PAM pulse phase control value ph1 or ph2 being set as the reference). In this manner, a plurality of PAM pulses are generated at periods which are symmetric with the period of the PAM pulse phase control value ph1 or ph2 being set as the reference, whereby the high frequency current of the current I shown in FIG. 2 can be further reduced.

In addition, the PAM pulse phase control value ph1 and the PAM pulse phase control value ph2 are a parameter derived from the second capacitor 3 and a parameter derived from the first capacitor 2, respectively.

For example, it is possible to define that the PAM pulse phase control value ph1=variable phreq−variable ton_hosei+variable uplowhosei. Meanwhile, it is possible to define that the PAM pulse phase control value ph2=variable phreq+variable ton_hosei+variable uplowhosei.

Here, a plurality of pieces of data, which are composed of the input current of the rectifier circuit 10 and the phase control amount of the control section corresponding to the input current, are set. Based on the set data, the phase control amount corresponding to the input current detected by an input current detecting section is calculated. A value of the variable phreq is determined in this manner. A value of the variable ton_hosei is controlled so that voltages of the capacitors 2 and 3 are equal to each other. Specifically, in a case where there exists a voltage difference between the voltage of the capacitor 2 and the voltage of the capacitor 3, phreq is changed so that the voltage difference becomes zero (that is, through PI control). Further, the variable uplowhosei is used for correcting an output phase of a pulse signal based on charge amounts of the capacitors 2 and 3. The correction is performed so as to eliminate a gap of a phase detected by a phase difference detecting section. Here, the gap of the phase detected by the phase difference detecting section is a gap between the output phase of the pulse signal and a phase of a pulse signal for making a waveform of the input current of the rectifier circuit 10 a sinewave.

At any stage of the zero cross interrupt pulse Zp1 to the zero cross interrupt pulse Zp3 (before the lapse of the predetermined period since the predetermined zero cross interrupt pulse Zp1), the control section calculates in advance the predetermined parameters again. Then, the control section retains the predetermined parameters after being calculated again in the buffer.

Next, after a lapse of the zero cross interrupt pulse Zp3 (after the lapse of the predetermined period), the predetermined parameters after being calculated again is used in common in calculating the timing at which the PAM interrupt pulse is generated after the zero cross interrupt pulse Zp3.

PAM interrupt pulses, which are generated at the PAM interrupt pulse generation timings calculated using the predetermined parameters after being calculated again and the other parameters, are shown after the zero cross interrupt pulse Zp3 in FIG. 3.

Figure 4:
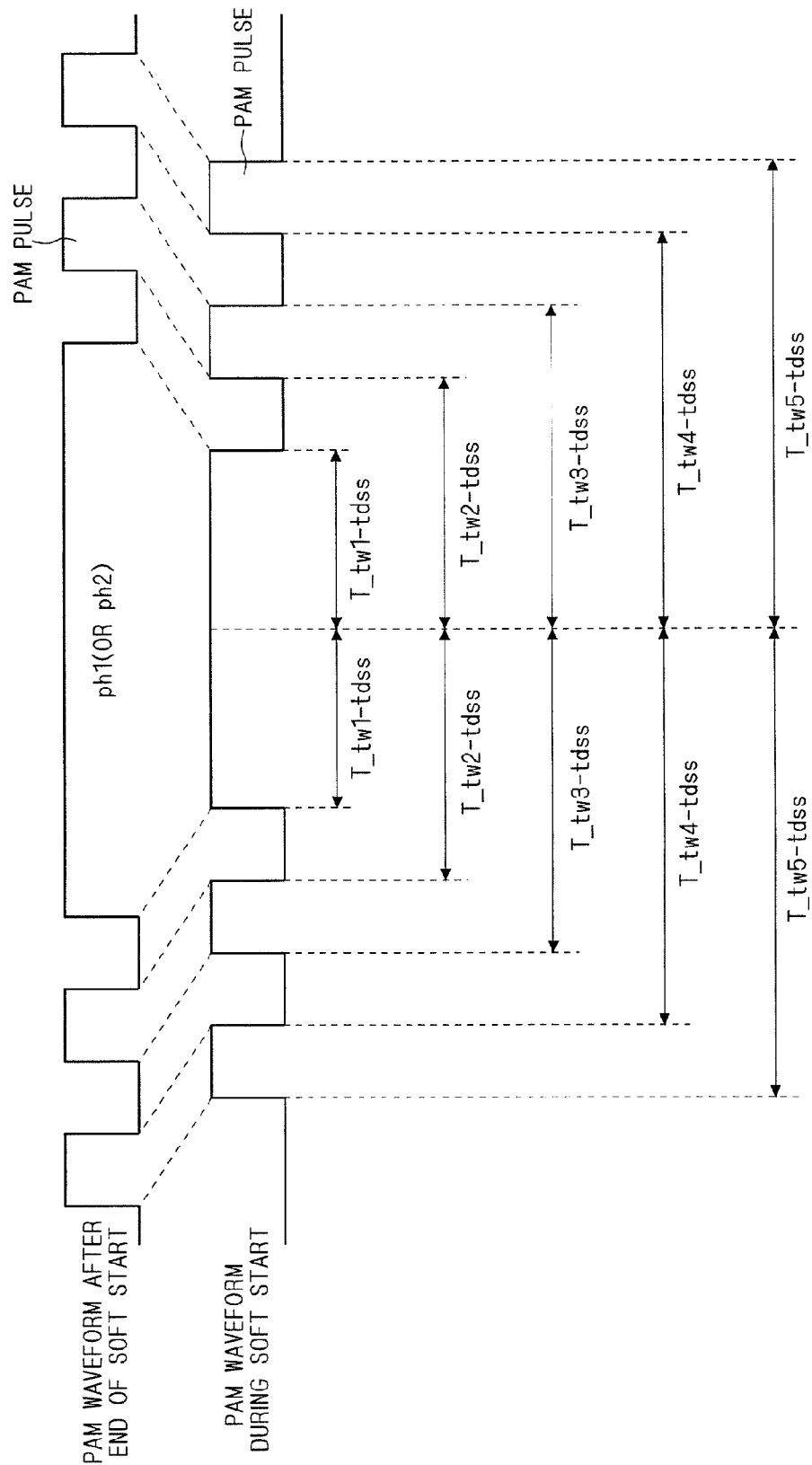
FIG. 4 is a diagram for describing a soft start process of a PAM pulse.

Here, in order to suppress abrupt fluctuations in DC voltage and the generation of the overcurrent in the PAM control, it is desirable to perform the soft start process for gradually increasing a PAM pulse width. The variable tdss serving as the predetermined parameter is a variable for defining the soft start of the PAM waveform (PAM pulse). FIG. 4 is a diagram showing states of the PAM waveforms (PAM pulses) during the soft start and after the end of the soft start.

As described above, in the power supply device according to the present invention, the control section uses in common the predetermined parameters ph1, ph2, tzwav, and tdss which are retained in the buffer in calculating the timings at which the PAM interrupt pulses are generated. Here, the calculation is performed over a predetermined period of the alternating-current power after the predetermined zero cross point is detected.

Accordingly, the predetermined parameters ph1, ph2, tzwav, and tdss are not updated and calculated again during the generation of the plurality of continuous PAM interrupt pulses. As a result, it is possible to prevent the generation of a partial loss or the like in the PAM waveform. Therefore, it is possible to prevent the abnormal current from flowing through the power supply device, which results form the partial loss or the like of the PAM waveform.

Further, in the power supply device according to the present invention, the timing at which the PAM interrupt pulse is generated is calculated over the following predetermined period of the alternating-current power after the lapse of the predetermined period of the alternating-current power. The calculation is performed using the predetermined parameters calculated again.

Accordingly, compared with the case where the predetermined parameters are not calculated again and updated at all, it is possible to prevent the deterioration of the voltage balance between the capacitors 2 and 3. Consequently, it is possible to prevent the generation of malfunction occurring in control of the compressor motor 40.

Note that, from the view point of control malfunction or the like of the compressor motor 40, the most preferred predetermined period of the alternating-current power is one period of the alternating-current power. This completely prevents malfunction from occurring in control of the compressor motor 40 while preventing a partial loss of the PAM waveform.

Note that the predetermined parameters ph1, ph2, tzwav, and tdss change in a time-series manner in accordance with the use of the power supply device. Accordingly, the control section updates and calculates again the predetermined parameters ph1, ph2, tzwav, and tdss for every predetermined period of the alternating-current power. As a result, it is possible to constantly maintain a suppression effect of a high frequency current.

While the invention has been shown and described in detail, the foregoing description is in all aspects illustrative and not restrictive. It is therefore understood that numerous modifications and variations can be devised without departing from the scope of the invention.

The invention claimed is:

1. A power supply device which converts alternating-current power into direct-current power and supplies the direct-current power to a load, comprising:
   a buffer;
   a control section;
   a rectifier circuit which rectifies the alternating-current power;
   a smoothing circuit which includes a first capacitor and a second capacitor connected in series, smoothes an output of the rectifier circuit, and outputs the direct-current power; and
   a switch provided between the rectifier circuit and a connection point between the first capacitor and the second capacitor,
   wherein the control section is configured to:
      detect a zero cross point of the alternating-current power input to the rectifier circuit;
      calculate in advance, at any stage prior to the detection of a predetermined zero cross point, predetermined parameters which are used when a generation timing of a PAM interrupt pulse is calculated, the PAM interrupt pulse being used when a PAM waveform having at least two or more pulses in a half period of the alternating-current power is generated and being input to the switch;
      retain the calculated predetermined parameters in the buffer;
      use in common, after the detection of predetermined zero cross point, the predetermined parameters retained in the buffer in calculating the generation timing of the PAM interrupt pulse over a predetermined period of the alternating-current power;
      calculate in advance the predetermined parameters again at any stage prior to a lapse of the predetermined period;
      retain, in the buffer, the predetermined parameters after being calculated again; and
      use, after the lapse of the predetermined period, the predetermined parameters after being calculated again in calculating the generation timing of the PAM interrupt pulse.

2. The power supply device according to claim 1, wherein the predetermined period is one period of the alternating-current power.

3. The power supply device according to claim 1, wherein the predetermined parameters comprise a PAM interrupt pulse phase control value which is a gap amount from the zero cross point of the alternating-current power and serves as a reference of the generation timing of the PAM interrupt pulse.

4. The power supply device according to claim 1, wherein the predetermined parameters comprise a gap value between the predetermined zero cross point of the alternating-current power and a generation timing of a predetermined zero cross interrupt pulse which indicates that the predetermined zero cross point is detected.

5. The power supply device according to claim 1, wherein the predetermined parameters comprise a variable for defining soft start of the PAM waveform.

6. The power supply device according to claim 5, wherein under a condition during generation of a pulse waveform or after detection of a PAM overcurrent by the control section, the control section is further configured to:
   calculate the variable for defining the soft start of the PAM waveform from a start to an end of the soft start; and
   calculate the generation timing of the PAM interrupt pulse using a PAM interrupt pulse phase control value which is a gap amount from the zero cross point of the alternating-current power and serves as a reference of the generation timing of the PAM interrupt pulse, a gap value between the predetermined zero cross point of the alternating-current power and the generation timing of a predetermined zero cross interrupt pulse which indicates that the predetermined zero cross point is detected, and the variable for defining the soft start of the PAM waveform.

* * * * *